United States Patent
Petry et al.

(10) Patent No.: US 12,325,800 B2
(45) Date of Patent: Jun. 10, 2025

(54) LASER ADDITIVE

(71) Applicant: Merck Patent GmbH, Darmstadt (DE)

(72) Inventors: Ralf Petry, Griesheim (DE); Adeliene Schmitt, Heidelberg (DE); Christof Hampel, Frankfurt am Main (DE)

(73) Assignee: Merck Patent GmbH, Darmstadt (DE)

( * ) Notice: Subject to any disclaimer, the term of this patent is extended or adjusted under 35 U.S.C. 154(b) by 652 days.

(21) Appl. No.: 17/760,807

(22) PCT Filed: Sep. 15, 2020

(86) PCT No.: PCT/EP2020/075678
§ 371 (c)(1),
(2) Date: Mar. 16, 2022

(87) PCT Pub. No.: WO2021/052919
PCT Pub. Date: Mar. 25, 2021

(65) Prior Publication Data
US 2022/0389227 A1  Dec. 8, 2022

(30) Foreign Application Priority Data

Sep. 17, 2019 (EP) .................................. 19197772

(51) Int. Cl.
| | |
|---|---|
| *C08K 9/10* | (2006.01) |
| *C08K 9/02* | (2006.01) |
| *C09C 1/02* | (2006.01) |
| *C09C 3/06* | (2006.01) |

(52) U.S. Cl.
CPC .................. *C09C 1/02* (2013.01); *C08K 9/02* (2013.01); *C09C 3/063* (2013.01); *C01P 2004/03* (2013.01); *C01P 2004/04* (2013.01); *C01P 2004/20* (2013.01); *C01P 2004/61* (2013.01); *C01P 2004/62* (2013.01); *C01P 2004/80* (2013.01); *C01P 2006/11* (2013.01); *C01P 2006/12* (2013.01); *C08K 2201/005* (2013.01); *C08K 2201/006* (2013.01)

(58) Field of Classification Search
None
See application file for complete search history.

(56) References Cited

U.S. PATENT DOCUMENTS

| | | | |
|---|---|---|---|
| 8,636,843 | B2 | 1/2014 | Jeong et al. |
| 10,266,699 | B2 | 4/2019 | Rueger et al. |
| 11,251,422 | B2 | 2/2022 | Nozoe et al. |
| 2009/0220840 | A1 | 9/2009 | Yamaguchi et al. |
| 2012/0292295 | A1 | 11/2012 | Edler et al. |
| 2017/0198146 | A1* | 7/2017 | McCarthy ........... C08L 23/0815 |
| 2017/0321058 | A1 | 11/2017 | Rueger et al. |
| 2017/0328072 | A1* | 11/2017 | Hannig ............. E04F 15/02038 |
| 2019/0218363 | A1 | 7/2019 | Van Kessel |

FOREIGN PATENT DOCUMENTS

| | | |
|---|---|---|
| CN | 102671624 B | 1/2014 |
| DE | 102010004743 A1 | 7/2011 |
| DE | 102014018276 A1 | 6/2016 |
| EP | 2508471 B1 | 6/2014 |
| JP | 5109130 B2 | 12/2012 |
| KR | 10-1478014 B1 | 1/2015 |

OTHER PUBLICATIONS

Machine translation of KR-101478014-B1 (no date).*
International Search Report dated Dec. 7, 2020 issued in corresponding PCT/EP2020/075678 application (2 pages).

* cited by examiner

*Primary Examiner* — Michael J Feely
(74) *Attorney, Agent, or Firm* — Millen, White, Zelano & Branigan, P.C.; Brion P. Heaney

(57) ABSTRACT

The present invention relates to a laser additive comprising core/shell particles, to a process for the preparation of a laser additive of this type, and to the use thereof, in particular as laser absorber in plastics and plastic-containing coatings of articles.

20 Claims, 7 Drawing Sheets

Laser marking of C-coated hydroxyapatite from Example 1

Laser marking of C-coated Plustalc H10® from Example 2

Laser marking of C-coated hydroxyapatite from Example 3

Comparative Example 1 - laser marking of C-coated boron nitride

Comparative Example 2 - laser marking of C-coated $Ca_3(PO_4)_2$

Comparative Example 3- laser marking of Printex® 60 carbon black.

Comparative Example 4- laser marking of Monarch® 280 carbon black.

Comparative Example 5- laser marking of a mixture of hydroxyapatite with carbon black SEM photomicrograph of hydroxyapatite 21223

SEM photomicrograph of Plustalc H10®

SEM photomicrograph of boron nitride

TEM photomicrograph of Example 1

TEM photomicrograph of Example 2

LASER ADDITIVE

The present invention relates to a laser additive comprising core/shell particles, to a process for the preparation of a laser additive of this type, and to the use thereof, in particular as laser absorber in plastics and plastic-containing coatings of articles.

White, grey or black laser markings of plastics can be generated by various reactions in the plastics. Thus, either the organic matrix of the plastic itself or alternatively an added laser additive can absorb the laser radiation, with the energy thereby released to the plastic leading to carbonisation or foaming of the plastic. In addition, laser additives present in the plastic can also react intrinsically to laser radiation and, under the influence of incident laser energy, change their coloration, for example by darkening or bleaching, or alternatively generate markings in the plastic due to evaporating or atomising themselves. These two forms of marking can equally be employed together.

In order to achieve pale markings in dark or black plastics, black additives, which decolourise due to the action of the laser and at the same time generate foaming in the plastic, are generally added to the plastic. The pores formed in the plastic during foaming lead to scattering of the incident light and are perceived visually by the observer as pale markings in the plastic.

Black additives that are generally employed are carbon blacks, for example industrial blacks or pigment blacks having particle sizes in the range from 1 nm to 100 nm, which are available, inter alia, under the trade names Printex®, Monarch® or Derussol®. These are traditionally employed for colouring plastics black and at the same time represent efficient absorbers for laser radiation, so that their use in plastics enables pale markings to be obtained by the action of lasers. However, experience shows that pale markings generated in this way frequently have a strong grey-brown coloration, which reduces the contrast to the black-coloured plastic. A possible cause here is incomplete decolourisation of the carbon-black particles and consequently undesired reactions with the plastic matrix. In the case where the markings generated by the action of a laser are also intended to serve, inter alia, for decorative purposes, miscolouration of the marking is of course disadvantageous.

DE10 2010 004 743 A1 discloses laser additives in the form of particles which consist of a white core and a covering, where the covering comprises elemental carbon. The white core here is chemically stable to the action of directed high-energy radiation. Besides the elemental carbon, the covering preferably comprises an organic polymer which is not carbonised by directed high-energy radiation. The action of a laser is claimed to decolourise the carbon in the laser absorber covering containing it and expose the white core without foaming taking place in the plastic. The pale markings obtainable are described as mechanically stable.

The amorphous carbon-black particles present in the covering of these laser additives behave analogously to carbon-black particles present in the plastic matrix and only decolourise incompletely under the action of a laser. In addition, the organic polymer surrounding the core particles in the covering would have to be completely colourless in order not to adversely influence the scattering capacity of the white core particles. Since this is not the case and in addition foaming of the plastic matrix does not occur, the laser markings obtainable with the laser additives described in DE10 2010 004 743 A1 likewise have reduced whiteness and thus a contrast deficit to the black-coloured plastic. Laser markings generated in this way are of only limited suitability for decorative applications.

DE 10 2014 018 276 A1 describes electrically conductive, coloured interference pigments which in each case have a flake-form support particle which has a coating comprising one or more interference layers and in which the outermost layer on the support particle consists of carbon. Interference pigments of this type can also be employed as laser absorbers. In order to be able to generate intense interference colours, the flake-form support particles must have the smoothest possible surface with few centres of scattering. In addition, the covering of the support particles with one or more interference layers ensures flat surfaces of the individual layers and thus improved reflection of the incident light for the generation of interference colours. However, the small surface area of these interference pigments leads, on use as laser absorbers, to a limited contact area of the outer carbon layer with the plastic surrounding the pigments and thus to little foaming of the plastic. This in turn causes little scattering of the incident light and therefore leads to rather low-contrast markings due to the influence of the laser beam.

The object of the present invention therefore consists in finding suitable laser absorbers which lead to decorative, very pale, high-contrast and sharp-edged markings in dark or black plastics when they are subjected to a laser beam, which lead to high-quality markings in a broad working range of the laser, in addition can be prepared from purely inorganic starting compounds of non-animal origin and are free from environmentally harmful pollutants.

A further object of the present invention consists in providing a process for the preparation of laser absorbers of this type.

In addition, an additional object of the present invention also consists in indicating the use of the said laser absorbers.

The object of the present invention is achieved by a laser additive comprising core/shell particles, where the core/shell particles in each case have a particulate core of homogeneous composition which contains alkaline-earth metal ions and OH groups and has a surface with OH groups located thereon, where the shell consists of carbon.

The object of the invention is likewise achieved by a process for the preparation of a laser additive in which core particles of homogeneous composition which contain alkaline-earth metal ions and OH groups and have a surface with OH groups located thereon are brought to reaction in a reactor a) in a mixture with a solid carbon-containing precursor compound, or b) with supply of a carbon-containing precursor compound in a stream of carrier gas, where the carbon-containing precursor compound is heated under inert gas to a temperature at which carbon is deposited from the carbon-containing precursor compound onto the surface of the core particles as outermost, continuous layer and a shell forms around the respective core particle.

In addition, the object of the invention is also achieved by the use of the laser additives described as laser absorbers in plastics or plastic-containing coatings on articles.

The present inventors have surprisingly found that optimal foaming of polymers with a high scattering capacity of the incident light that are subjected to a laser beam can be achieved if, besides a composition of the laser absorbers used which is optimal in material terms, it is also possible to ensure a large surface area of these laser absorbers.

Core/shell particles have therefore been found which have core particles having a large specific surface area and in which core and shell are intimately connected to one another in such a way that optimal mutual transfer of the energy input by the laser takes place between core and shell in such a way that, on use, the plastic surrounding the particles of the laser additive foams forming fine pores when subjected to the laser beam to an adequate extent in order to achieve optimal scattering of the incident light and consequently high whiteness of the laser marking generated.

For the purposes of the present invention, laser marking is taken to mean any type of labelling of plastics and plastic-containing coatings on articles, which can be generated in the form of an inscription, a code, a label, a decoration or a similar visible optical change in the plastic through the action of the laser beam.

Suitable plastics are all known amorphous and partially crystalline thermoplastics and thermosetting plastics, in particular plastics which do not intrinsically exhibit a visual change when subjected to a laser.

Suitable laser additives have proven to be, in particular, core/shell particles in which the material of the shell and also partially of the core particles absorbs the laser energy introduced. The core particle is only modified slightly by the laser energy introduced, but does not change in colour, whereas the material of the shell is decolourised. Since the laser energy input takes place both into the shell and also partially into the core particle and the two are intimately connected to one another, the energy stored by the core particle can be released directly to the material of the shell and can effectively support the decolourisation reaction taking place there.

The particulate cores of the laser absorbers in accordance with the present invention have a homogeneous composition in material terms, contain alkaline-earth metal ions and OH groups and have a surface on which OH groups are likewise located.

Suitable alkaline-earth ions are $Ca^{2+}$, $Mg^{2+}$ and $Ba^{2+}$, which are present in the core particles either individually or in the form of two or more. OH groups are present at the surface of the core particles. Some of these OH groups serve to chemically bind the carbon of which the shell of the core/shell particles consists. Further OH groups are close to the surface and present in the interior of the core particles.

In order to achieve, on use, a large contact area between the laser absorber according to the invention and the plastic matrix surrounding the latter, it is necessary for the core particles to have a relatively large specific surface area and a low solid density, in particular a low bulk density. This can best be achieved by means of core particles which are highly porous or have a large proportion of surface irregularities—such as, for example, edges, corners, etc.

Accordingly, a powder which consists of the uncoated core particles has a bulk density of $\leq 0.5$ g/cm$^3$, preferably $\leq 0.3$ g/cm$^3$. The bulk density of the core particles employed in accordance with the invention is determined in accordance with DIN 53468 or DIN ISO 697 using a bulk density measuring instrument from Ceast (model number 16258), which consists of a standardised funnel and a defined 100 ml beaker. The beaker is weighed before and after the standardised filling and the bulk density is determined from the values obtained from the differential weighing and the defined volume of the bed. A +/−0.1 g precision balance is necessary.

In addition, the uncoated core particles have a specific surface area of $\geq 5$ m$^2$/g (BET), in particular $\geq 10$ m$^2$/g (BET).

The shape of the particulate cores (core particles) is either irregular and granular or flake-shaped, with irregular granules being preferred.

The particulate cores have a particle size in the range from 0.1 to 100 μm, where these values relate to the volume-averaged $d_{10}$ (0.1 μm) or $d_{90}$ (100 μm) values determined by means of the laser diffraction method. Preferably, the $d_{10}$ value is 0.5 μm and the $d_{90}$ value is $\leq 20$ μm.

The laser diffraction method is generally familiar and has the advantage over other methods that, besides the actual particle size, it is also possible to determine the particle size distribution. For the core particles employed in accordance with the invention, the particle sizes have been determined using a Malvern Mastersizer 3000, APA 300 (product from Malvern Instruments, Ltd., UK).

Materials such as $Ca_5(OH)(PO_4)_3$, $Mg_3Si_4O_{10}(OH)_2$ or $Ba^{2+}$- or $Mg^{2+}$-modified $Ca_5(OH)(PO_4)_3$ have proven particularly suitable for use as particulate cores for the core/shell particles according to invention. Corresponding particulate materials are commercially available from various companies in the corresponding particle sizes as hydroxyapatite ($Ca_5(OH)(PO_4)_3$) or $Ba^{2+}$- or $Mg^{2+}$-modified hydroxyapatite or talc ($Mg_3Si_4O_{10}(OH)_2$).

Hydroxyapatite is available, for example, from Sigma-Aldrich (now Millipore-Sigma) and suitable talc is available from Mondo Minerals B.V. (NL). Plustalc® H10 from Mondo Minerals B.V. is preferably employed in accordance with the invention. However, unmodified hydroxyapatite (p.a.) from Sigma-Aldrich or the corresponding product from Millipore-Sigma is very particularly preferably employed. Both materials meet the prerequisites with respect to material composition, particle size, bulk density and specific surface area.

The core particles absorb laser radiation, in particular in the NIR region, but remain without visible chemical change under the action of laser radiation. In addition, they absorb virtually no light in the spectral wavelengths in the range from 380 nm to 780 nm, i.e. have no or only a slight inherent colour.

The shell of the core/shell particles according to the invention consists of carbon. Carbon is in the form of a mixture of nanocrystalline and amorphous carbon, where the parts by weight of nanocrystalline and amorphous carbon range in a ratio from 70:30 to 90:10 and preferably in a ratio from 80:20 to 90:10. The crystalline fraction can be referred to as graphitic carbon and has a lateral dimension in the region of a few nanometres in each case. This is a mixture having a statistical distribution of the amorphous fraction and of the carbon nanocrystals.

Each of the core particles is completely covered with a continuous layer of the shell consisting of carbon. The shell is bonded to the core particle via oxygen bridges, which gives the core/shell particles high mechanical strength. The shell consists of a plurality of carbon layers, which have a total geometrical thickness in the range from 1 nm to 20 nm, preferably in the range from 2 nm to 10 nm. The thickness of the shell can be established in the usual way via evaluation of cross sections.

The laser additives according to the invention are prepared by chemical deposition of carbon directly onto the surface of the core particles. The process is described in greater detail below. The carbon is generated from suitable carbon-containing precursor compounds. At the beginning of the coating process, carbon-containing fragments are generated from the carbon-containing precursor compound by the action of elevated temperature and partially bond to free OH groups on the surface of the core particles via oxygen bridges. This produces a mechanically strong connection between core particles and shell and at the same time ensures optimal energy transfer between core particle and shell. Under the action of the laser radiation, in particular in the NIR region, very high temperatures occur locally for a short time at the outer carbon layer of the laser additives according to the invention since, for example, the peak output in the case of pulsed lasers is in the region of a few kilowatts. Due to the further transmission of the introduced energy into the respective core particle, OH groups at the surface and close to the surface of the core particle cleave off water in the gaseous state, which reacts very efficiently with the carbon bonded at the surface of the shell to form $CO_2$. The latter ensures foaming of the plastic matrix in the immediate environment of the respective laser additive and thereby minimises undesired side reactions of the carbon of the shell with the surrounding plastic matrix. Disadvantageous discolorations of the plastic matrix can thereby be substantially prevented. In addition, this reaction is supported by the high porosity or the presence of a large number of surface irregularities of the core particles. Since the shell consisting of carbon surrounds each of the core particles as a continuous layer, the resultant core/shell particles also have a large specific surface area or high surface irregularity. The contact area of the laser additive with the surrounding plastic matrix is therefore very large and ensures both optimal energy transfer to the plastic matrix and also finely divided $CO_2$ formation close to the particles, which together support foaming of the plastic and cause optimal scattering of the plastic foam, which has the consequence of high whiteness of the marking. In addition, these processes are additionally supported by inherent overtone absorption of NIR wavelengths (on use of corresponding types of laser) by $OH^-$ groups present at the surface and close to the surface of the core particles, which leads to additional introduction of energy into the core particles under the action of a laser.

The present invention also relates to a process for the preparation of the laser additive described, in which core particles of homogeneous composition which contain alkaline-earth metal ions and OH groups and have a surface with OH groups located thereon are brought to reaction in a reactor, where the core particles are either mixed with a solid carbon-containing precursor compound or alternatively a carbon-containing precursor compound in a stream of carrier gas is fed to the core particles, where the carbon-containing precursor compound is heated under inert gas to a temperature at which carbon deposits therefrom as the outermost, continuous layer on the surface of the core particles and a shell forms around the respective core particle.

Suitable core particles are the particles of homogeneous composition already described above which contain alkaline-earth metal ions and OH groups in the particle and have a surface on which OH groups are located.

The alkaline-earth ions are selected from the group consisting of $Ca^{2+}$, $Mg^{2+}$ and $Ba^{2+}$, with $Ca^{2+}$ and $Mg^{2+}$ being particularly preferred.

The core particles either have an irregular granular shape and have high porosity, which is expressed in a large specific surface area, or have an irregular flake shape with many centres of scattering. Details in this respect have already been described above.

Particularly preferably suitable core materials are $Ca_5(OH)(PO_4)_3$, $Mg_3Si_4O_{10}(OH)_2$ or $Ba^{2+}$- or $Mg^{2+}$-modified $Ca_5(OH)(PO_4)_3$, with unmodified $Ca_5(OH)(PO_4)_3$ being particularly preferably employed.

The particle sizes of the uncoated core particles are in the range from 0.1 μm to 100 μm, where the first value represents the $d_{10}$ value of a volume-averaged determination and second value represents the $d_{90}$ value of a volume-averaged determination by means of laser diffractometry.

Corresponding core particles in the said particle sizes are commercially available from various suppliers.

The respective particulate cores are then introduced into the reactor.

Suitable reactors are both rotary tube furnaces and fluidised bed reactors. The coating process with the carbon of the shell is carried out in a stream of carrier gas. The carrier gas employed is an inert gas, synthetic air or forming gas. Examples of inert gases are nitrogen or argon, with nitrogen being preferably employed.

In a fluidised bed reactor, a carbon-containing precursor compound, which preferably consists of readily volatile hydrocarbons, which, besides carbon, contain only hydrogen and possibly oxygen, is fed to the carrier gas. Acetone, p-xylene, acetylene, toluene and 2-methyl-3-butynol-2 may be mentioned here by way of example, with acetone, p-xylene and toluene preferably being employed.

The process in a rotary tube furnace can likewise be carried out as described for the fluidised bed reactor. In addition, the carbon source employed here can also be solid, pulverulent carbon-containing compounds, which are mixed in advance with the core particles and form, in a solid-state reaction—likewise kept in motion by an stream of inert gas and continuous rotation of the furnace—with the core particles, a compact carbon shell which completely surrounds the latter. These pulverulent carbon-containing compounds are selected from the group consisting of mono-, di- and trisaccharides. These are preferably fructose, glucose (=dextrose), galactose, xylose, mannose, lactose, sucrose, maltose or mixtures of two or more thereof. In a particularly preferred embodiment, very finely ground sucrose is employed.

During the coating reaction of the particulate cores with the carbon of the shell, it is of particular importance for the success of the process that the core particles are kept in motion in order that each of the core particles can be surrounded uniformly by a continuous carbon layer which forms the shell of the core/shell particles. The corresponding optimised fluidisation of the core particles can be achieved in the fluidised bed reactor either via the carrier-gas stream itself or, if this is not sufficient, via suitable fluidisation apparatuses, vibration devices or shaking devices. In the rotary tube furnace, the fluidisation generally takes place via the rotation process and the gas stream.

When sufficient fluidisation of the core particles has been achieved, a temperature is established in the reactor that is sufficient to decompose the carbon-containing precursor compound to such an extent that carbon formed in the process deposits on the surface of the core particles as outermost, continuous layer. As already described above, carbon-containing fragments of the precursor compounds form in the initial phase of the decomposition process and are strongly bonded to the OH groups on the surface of the core particles via oxygen bridges, so that the subsequent layer structure comprising carbon layers which forms the shell of the core/shell particles forms a mechanically strong, chemical bond to the core particles.

The temperature in the reactor during the coating process is in the range from 500 to 850° C., with the temperature specifically set being determined by the type of carbon-containing precursor compound and the choice of reactor. In the case of the use of acetone, for example, a temperature range from 600 to 700° C. is preferred, whereas on use of p-xylene or toluene a temperature range from 700 to 800° C. is advantageously set. In the case of solid, carbon-containing precursor compounds in the rotary tube furnace, the preferred temperature is in the range from 600 to 800° C.

If a readily volatile carbon-containing precursor compound is used, this is preferably fed to the carrier gas after the reaction temperature has been reached. The amount of carbon-containing precursor compound can be controlled here via the temperature or the vapour pressure of the compound. When the desired layer thickness of the carbon shell, which grows on the core particles depending on the reaction time, has been reached, the carbon source is turned off.

The duration of the reaction time is 60 to 480 min on use of readily volatile carbon-containing precursor compounds, preferably 100 to 240 min, while it is in the range from 20 to 240 min, in particular in the range from 30 to 90 min, in the rotary tube furnace on use of solid carbon-containing precursor compounds. Within and directly dependent on this reaction time, a continuous, compact carbon shell completely surrounding the individual particles grows on the core particles. This shell consists of a plurality of layers of carbon, which are in the form of a mixture of nanocrystalline and amorphous carbon, where the parts by weight of nanocrystalline and amorphous carbon range in a ratio from 70:30 to 90:10 and are preferably in a ratio from 80:20 to 90:10. The crystalline fraction can be referred to as graphitic carbon and has a lateral dimension in the region of a few nanometres in each case. This is a mixture having a statistical distribution of the amorphous fraction and the carbon nanocrystals.

In accordance with the invention, the geometrical layer thickness of the carbon shell is in the range from 1 to 20 nm, preferably in the range from 1 to 15 nm and particularly preferably in the range from 2 to 10 nm. A smaller layer thickness of the shell would lead to inadequate formation of $CO_2$ and allow only slight foaming of the plastic matrix on use. A layer thickness of the carbon shell of the core/shell particles exceeding 20 nm would, by contrast, make exchange of energy introduced by the laser between shell and core particles more difficult and possibly lead to undesired side reactions of the carbon of the shell with the surrounding plastic matrix, which could possibly cause miscolouration of the plastic matrix.

After the thermal treatment in the reactor, the core/shell particles obtained are cooled and optionally classified.

The present invention also relates to the use of the core/shell particles described above as laser absorbers in plastics and plastic-containing coatings on articles.

Plastics which can be employed are all conventional amorphous or partially crystalline thermoplastics or thermosetting plastics. In particular, the use of the laser additives according to the invention in plastics which do not already react intrinsically to the input of laser radiation with discolouration, but instead are reliant on the addition of additives in order to be laser-mark-able, is indicated. Examples which may be mentioned here are polyethylene, polypropylene, polyamides, polyester, polyester-ester, polyether-ester, polyphenylene ether, polyacetal, polyurethane, polybutylene terephthalate (PBT), polymethyl methacrylate, polyvinylacetal, polystyrene, acrylonitrile-butadiene-styrene (ABS), acrylonitrile-styrene-acrylate (ASA), poly-carbonate, polyether sulfones and polyether ketones, including copolymers, mixtures or polymer blends thereof. However, this list should merely be regarded as illustrative and is not complete.

The laser additive according to the invention is incorporated into the plastic to be marked, preferably a plastic body or a plastic film, or a coating, for example a paint, a paper coating or powder coating, an automotive paint or a printing ink, by mixing the polymer granules, the paint or the printing ink with the laser additive and shaped, if necessary under the action of heat. The laser additive can be added to the plastic material at the same time or successively. During incorporation of the laser additive, adhesion promoters, organic solvents, stabilisers and/or surfactants which are temperature-stable under the working conditions can optionally be added to the plastic material, preferably plastic granules.

Plastic granules to which the laser additive has been added are generally prepared by introducing the plastic granules into a suitable mixer, wetting them with any additives and then adding and incorporating the laser additive. The pigmentation of the plastic is usually carried out via a colour concentrate (masterbatch) or compound. The mixture obtained in this way can then be processed directly in an extruder or injection-moulding machine. The mouldings obtained in the case of processing of this type exhibit a very homogeneous distribution of the laser additive. The resultant mouldings, films or coatings on articles can subsequently be subjected to conventional marking using a suitable laser.

The laser additive according to the invention is added to the plastic intended for laser marking in a proportion of 0.1 to 30% by weight, preferably 0.5 to 20% by weight and very particularly preferably 1 to 10% by weight, in each case based on the weight of the plastic to be marked.

Lasers which are highly suitable for the laser marking of plastics or plastic-containing coatings on articles are solid-state lasers or fibre lasers of wavelengths 534 nm (green lasers) and 1064 nm or 1062 nm (NIR lasers; NIR=near infrared).

Pulsed solid-state or fibre lasers of wavelengths 1064 nm or 1062 nm, for example solid-state lasers having an emission wavelength of 1064 nm consisting of Nd:YAG or Nd:yttrium vanadate monocrystals or fibre lasers having an emission wavelength of 1064/1062 nm in accordance with the dual-core concept, consisting of a high-purity, active quartz core doped with Ge, Al or P und rare-earth ions (for example $Nd^{3+}$, $Er^{3+}$ or $Yb^{3+}$) and surrounded by a quartz pump core of lower refractive index, have proven particularly suitable.

The laser markings generated can be employed in all cases where abrasion-resistant, very pale and sharp-edged markings are to be generated on dark or black plastic. Use examples, which are not exhaustive by far, are therefore control panels in the motor vehicle and aircraft industry, in electrical engineering/electronics and machine and instrument construction; inscriptions or markings of equipment, instruments and consumer articles, such as, for example, washing machines, coffee machines, smartphones or television sets; logos, model designations or individual markings for equipment of all types, for containers, toys or tools and not least decorative labels in the advertising sector.

Due to the material and particle properties of the core particles employed and the carbon shell bonded thereto in an abrasion-resistant manner, the laser additives according to the invention, on use as laser absorbers, exhibit a synergistic reaction which utilises the introduced laser energy optimally for the formation of fine-pored $CO_2$ in the immediate environment of the laser additive and, due to foaming of the plastic matrix, leads to very pale laser markings in the corresponding plastics that are virtually free from undesired miscolourations and can therefore also be applied for decorative purposes. In addition, the laser markings obtainable have good edge sharpness and can be obtained over a broad range of laser parameters, which leads to high flexibility during the marking process. Furthermore, the laser additives according to the invention consist of purely inorganic compounds of non-animal origin and contain no harmful substances, which also makes them suitable for use in ethically or religiously sensitive areas of application.

WORKING EXAMPLES

Example 1

Figure 1:
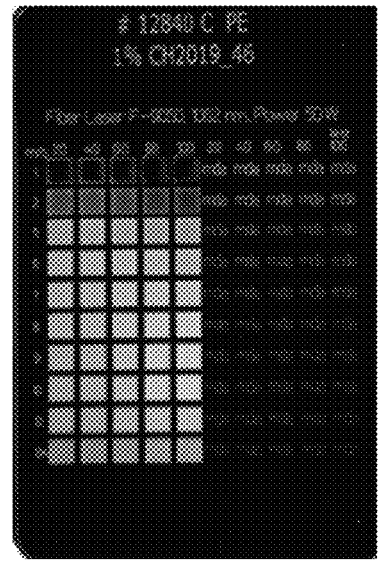
FIG. 1 shows a laser-inscribed test piece with a laser additive in accordance with Example 1
Figure 2:
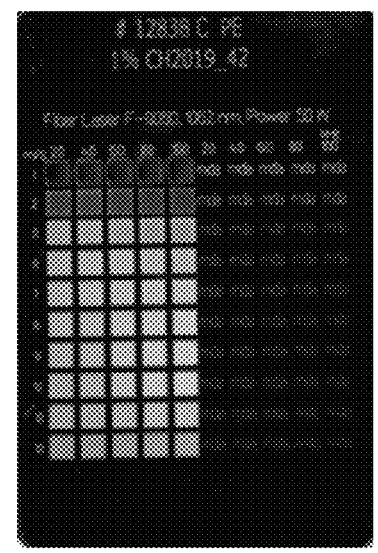
FIG. 2 shows a laser-inscribed test piece with a laser additive in accordance with Example 2
Figure 3:
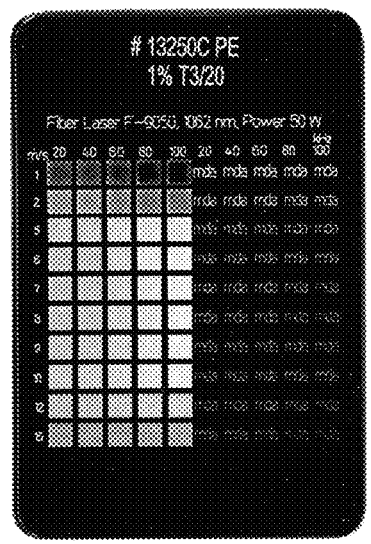
FIG. 3 shows a laser-inscribed test piece with a laser additive in accordance with Example 3
Figure 4:
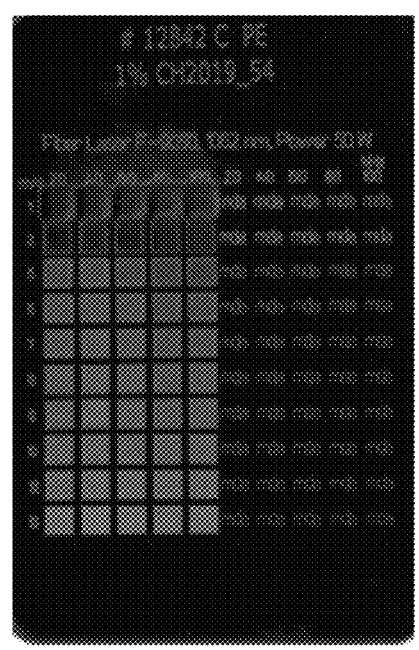
FIG. 4 shows a laser-inscribed test piece with a laser additive in accordance with Comparative Example 1
Figure 5:
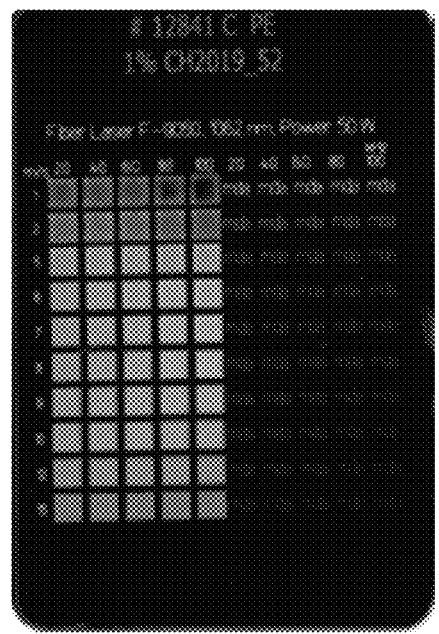
FIG. 5 shows a laser-inscribed test piece with a laser additive in accordance with Comparative Example 2
Figure 6:
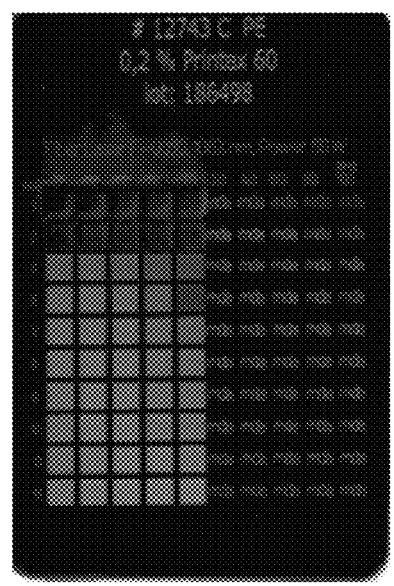
FIG. 6 shows a laser-inscribed test piece with a laser additive in accordance with Comparative Example 3
Figure 7:
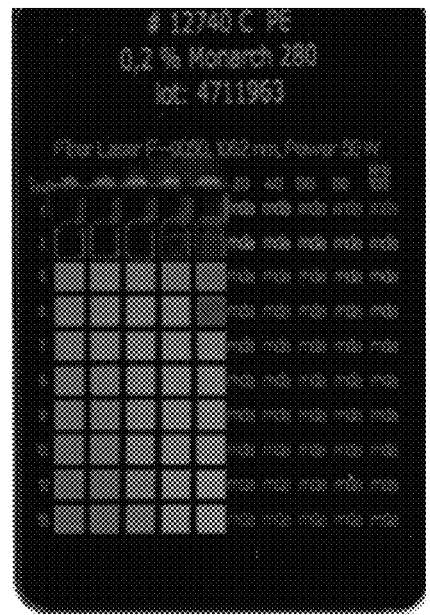
FIG. 7 shows a laser-inscribed test piece with a laser additive in accordance with Comparative Example 4
Figure 8:
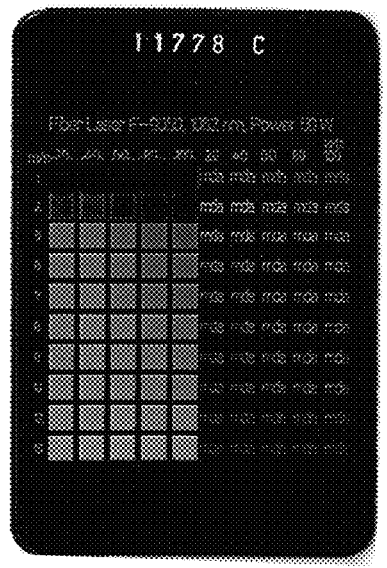
FIG. 8 shows a laser-inscribed test piece with a laser additive in accordance with Comparative Example 5
Figure 9:
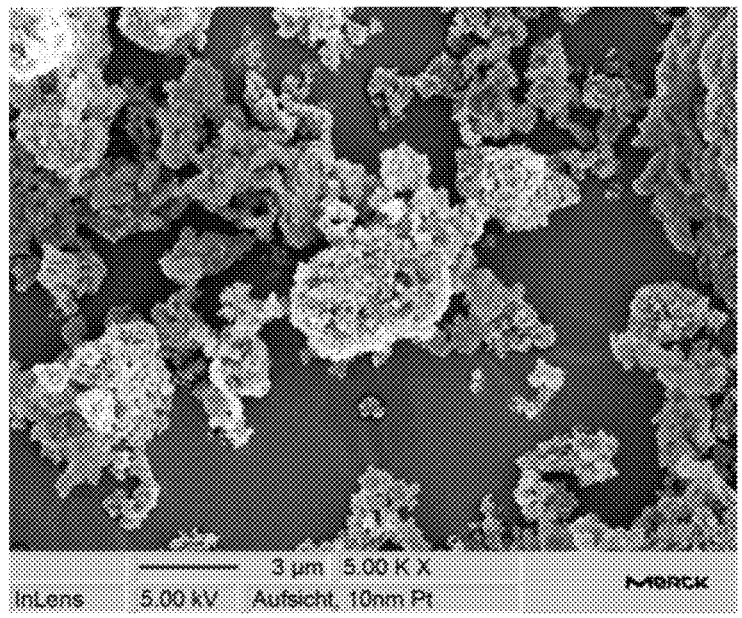
FIG. 9 shows an SEM photomicrograph of the core particles in accordance with Example 1

Coating of Hydroxyapatite Core Particles in a Fluidised Bed Via Chemical Gas-Phase Deposition 500 g of hydroxyapatite from Sigma-Aldrich (Article 21223) having a bulk density of 0.26 g/cm$^3$ is heated to a temperature of 750° C. in an $N_2$-flushed fluidised bed reactor having an internal diameter of 100 mm under a constantly inert $N_2$ atmosphere. The volume flow rate of the nitrogen is set so that minimal fluidisation takes place in the reactor and optimal mixing of the starting materials and optimal energy transfer is thus ensured. When the reaction temperature has been reached, the carbon-containing precursor compound is introduced into the reactor by means of the stream of nitrogen. The carbon-containing precursor compound employed is p-xylene. The precursor compound is thermally decomposed in the reactor, and carbon layers having a total thickness in the range from 1 to 10 nm grow on the core particles over a reaction time of 120 minutes. FIG. 9 shows an SEM photomicrograph of the hydroxyapatite core particles employed.

Example 2

Figure 10:
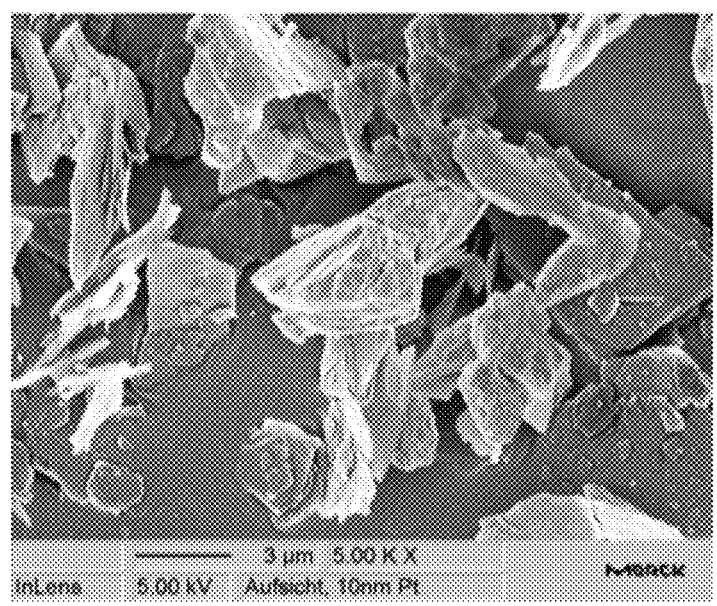
FIG. 10 shows an SEM photomicrograph of the core particles in accordance with Example 2

Coating of Core Particles Comprising Plustalc H10® from Mondo Minerals B.V. in a Fluidised Bed Via Chemical Gas-Phase Deposition The process is carried out analogously to Example 1 using 500 g of the core particles. An SEM photomicrograph of the core particles employed is shown in FIG. 10. The product has a bulk density of 0.24 g/cm$^3$. The thickness of the carbon layer is in the range from 2 to 10 nm.

Example 3

Coating of Hydroxyapatite Core Particles in a Rotary Tube Furnace Via a Solid-State Reaction with Very Finely Ground Sucrose in the Form of Powdered Sugar 500 g of hydroxyapatite from Sigma-Aldrich (Article 21223) having a bulk density of 0.26 g/cm$^3$ are mixed intimately with 188 g of powdered sugar in a Turbular T2F 3D shaking mixer from Willy A. Bachofen AG and subsequently calcined in a Nabertherm RSRC rotary tube furnace under an inert atmosphere. To this end, the stainless steel tube is heated to 700° C. and rotated at a speed of 1 rotation per second. The powder mixture is transferred into the feeder and metered uniformly into the furnace, which is flushed with 200 l/h of the nitrogen, via a conveying screw. The residence time in the furnace is 45 minutes. A carbon proportion of 8.5% by weight is achieved.

COMPARATIVE EXAMPLES

Comparative Example 1

Figure 11:
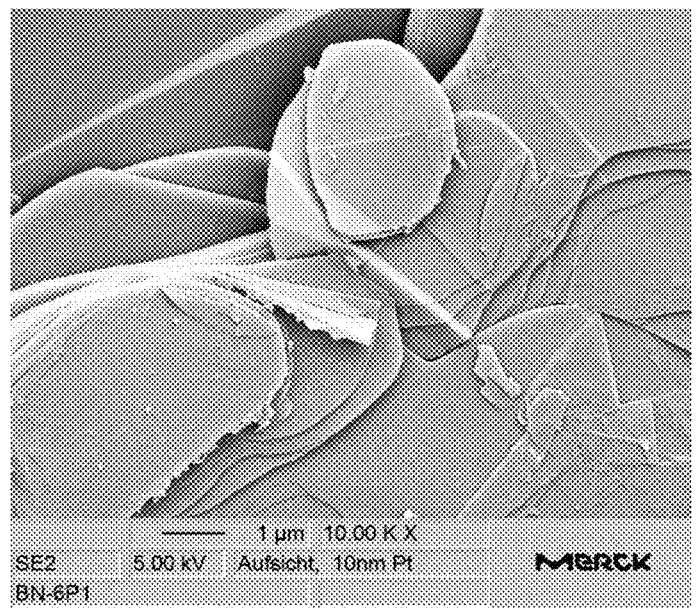
FIG. 11 shows an SEM photomicrograph of the core particles in accordance with Comparative Example 1

Coating of Core Particles Comprising Boron Nitride in a Fluidised Bed Via Chemical Gas-Phase Deposition 500 g of S1-SF® flake-form boron nitride from 3M are employed as core particles. The starting material consists of flakes having a regular shape, a smooth surface and few centres of scattering. FIG. 11 shows an SEM photomicrograph of the starting material.

The process is carried out analogously to Example 1. The carbon shell has a thickness in the range from 2 to 10 nm.

Comparative Example 2

Coating of Core Particles Comprising Calcium Phosphate $Ca_3(PO_4)_2$ without OH Groups Close to the Surface in a Fluidised Bed Via Chemical Gas-Phase Deposition 500 g of calcium phosphate $Ca_3(PO_4)_2$ (Article 22147 from VWR) are employed as core particles. The starting material contains alkaline-earth ions, but does not have OH groups either in the core or at the surface of the particles.

The process is carried out analogously to Example 1. The carbon shell has a thickness in the range from 2 to 10 nm. Production of Plastic Test Pieces and Laser Marking:

The pigment powders obtained from Examples 1 to 3 or Comparative Examples 1 and 2 are mixed with polyethylene granules and wetting additives in a concentration of 1% by weight, based on the total weight, in a mixer and subsequently extruded. The compound obtained is converted into test plates having a size of 6×9 cm using an injection-moulding machine.

For further comparison, the same test plates (Comparative Examples 3 and 4) are produced with known laser additives (Monarch® 280 carbon black, Printex® 60 carbon black), with these laser additives being added in an amount of 0.2% by weight of the total weight, in order to achieve similar carbon contents compared with Examples 1 and 2 and Comparative Examples 1 and 2.

In addition, the following procedure is followed for Comparative Example 5:

18 g of hydroxyapatite from Sigma-Aldrich (Article 04238) having a bulk density of 0.26 g/cm$^3$ are mixed with 2 g of carbon black (Printex® 60, Degussa) and homogenised by grinding in a laboratory mill (Severin KM 3868 coffee mill) for 3 minutes. The mixture is mixed with polyethylene granules and wetting additives in a concentration of 1% by weight, based on the total weight, in a mixer and subsequently extruded. The compound obtained is converted into test plates having a size of 6×9 cm using an injection-moulding machine.

The test plates are inscribed using a fibre laser. A test grid is used which covers the following performance parameters in pulse mode:

KBA Fibre Laser (F-9050, UHS):
  Wavelength: 1062 nm
  Output power: 50 W
  Power in the test grid: 100% of the output power
  Frequency: 20-100 kHz
  Speed: 1-15 m/s Equivalent laser marking results can also be achieved with other customary lasers for the marking of plastic parts, for example using a vanadate laser under the following conditions:

Trumpf Vanadate Laser (Vectormark 5):
  Wavelength 1064 nm
  Output power: 10.5 W
  Power in the test grid: 100% of the output power
  Frequency: 20-100 kHz
  Speed: 500-4000 mm/s The material properties of the specimens and details on the coating process and laser inscription are summarised in Table 1.

TABLE 1

| Sample | Volume-weighted percentile values - Malvern Mastersizer © | | | BET spec. surface area (nitrogen sorption) Specific surface area/ | CVD coating | | | |
|---|---|---|---|---|---|---|---|---|
| | d10/μm | d50/μm | d90/μm | (m$^2$/g) | Carbon source | Carbon content/ wt % | Reaction temperature/ °C | Nitrogen flow rate fluidised bed/ (l/min) |
| Hydroxyapatite Sigma Aldrich 21223 | 1.5 | 3.9 | 9.6 | 62 | p-Xylene | 7.5 | 750 | 1.2 |
| Hydroxyapatite Sigma Aldrich 21223 | 1.6 | 6.2 | 11.1 | 51 | Sucrose | 8.5 | 700 | 3.3 |
| Plustalc H1 © Mondo | 3.6 | 8.4 | 16.4 | 10.1 | p-Xylene | 8.0 | 750 | 1.2 |
| Boron nitride S1-SF © | 0.8 | 7.8 | 16.7 | 16.7 | p-Xylene | 8.9 | 750 | 1.2 |
| Ca3(PO4)2 - VWR | 2.5 | 8.2 | 21.1 | 11.4 | p-Xylene | 6.0 | 750 | 1.2 |
| Monarch © 280 carbon black | | 0.045 | | 45.0 | | | | |
| Printex © 60 carbon black | | 0.021 | | 115.0 | | | | |

| Sample | CVD coating Reaction time t/min | Concentration in polyethylene/ wt % | LASER marking KBA F 9050 fibre LASER | | |
|---|---|---|---|---|---|
| | | | LASER power/ W | Frequency/ kHz | Writing speed/ (m/s) |
| Hydroxyapatite Sigma Aldrich 21223 | 120 | 1.0 | 50 | 20-100 | 1-15 |
| Hydroxyapatite Sigma Aldrich 21223 | 45 | 1.0 | 50 | 20-100 | 1-15 |
| Plustalc H1 © Mondo | 120 | 1.0 | 50 | 20-100 | 1-15 |
| Boron nitride S1-SF © | 120 | 1.0 | 50 | 20-100 | 1-15 |
| Ca3(PO4)2 - VWR | 120 | 1.0 | 50 | 20-100 | 1-15 |
| Monarch © 280 carbon black | | 0.2 | 50 | 20-100 | 1-15 |
| Printex © 60 carbon black | | 0.2 | 50 | 20-100 | 1-15 |

The results of the laser inscriptions in the test grid are shown in FIGS. 1 to 8. The specimens clearly show that the inscriptions for Examples 1, 2 and 3 (FIG. 1-3) give rise to very pale markings over virtually the entire test grid, whereas Comparative Examples 1-5 (FIG. 4-8) only lead to very unclear or brownish discoloured markings. This result is notable in particular in respect of Comparative Example 5.

Figure 12:
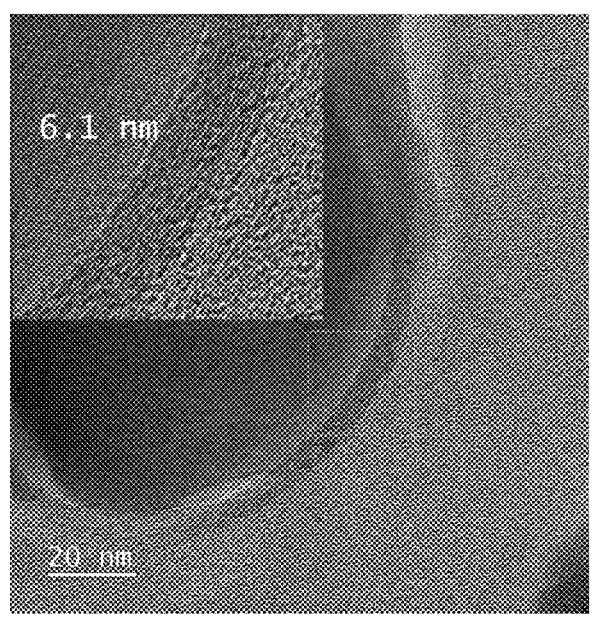
FIG. 12 shows a TEM photomicrograph of the laser additive in accordance with Example 1 with enlarged detail
Figure 13:
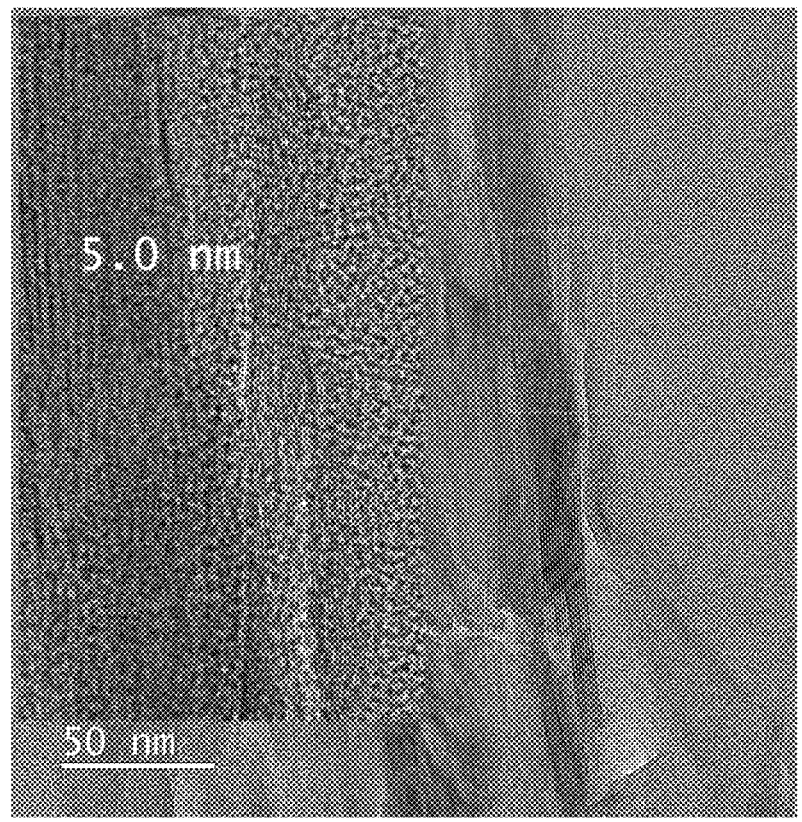
FIG. 13 shows a TEM photomicrograph of the laser additive in accordance with Example 2 with enlarged detail The present invention is intended to be explained below with reference to examples, but is not restricted to these.

FIGS. 12 and 13 show TEM photomicrographs of laser additives in accordance with Example 1 (FIG. 12) and Example 2 (FIG. 13). The carbon shell is shown with enlarged detail.

The invention claimed is:

1. A laser additive comprising core/shell particles, characterised in that the core/shell particles in each case have a particulate core of homogeneous composition which consists of $Ca_5(OH)(PO_4)_3$, $Ba^{2+}$-modified $Ca_5(OH)(PO_4)_3$, or $Mg^{2+}$-modified $Ca_5(OH)(PO_4)_3$, where the shell consists of carbon.

2. The laser additive according to claim 1, wherein the particulate cores have a bulk density of ≤0.5 g/cm³.

3. The laser additive according to claim 1, wherein the particulate cores have a specific surface area of ≥5 m²/g (BET).

4. The laser additive according to claim 1, wherein the particulate cores have an irregular particle shape or a flake shape.

5. The laser additive according to claim 1, wherein the particulate cores have a particle size in the range from 0.1 to 100 μm.

6. The laser additive according to claim 1, wherein the shell in each case completely surrounds the particulate core in a continuous layer and is chemically bonded to the particulate core.

7. The laser additive according to claim 1, wherein the shell has a geometrical thickness in the range from 1 to 20 nm.

8. The laser additive according to claim 1, wherein the shell consists of a mixture of nano crystalline carbon and amorphous carbon with proportions by weight in the ratio from 70:30 to 90:10.

9. The laser additive according to claim 1, wherein the particulate cores have a particle size with a $d_{10}$ value of ≥0.5 μm and a $d_{90}$ value of ≤20 μm, and the shell has a geometrical thickness in the range from 2 to 10 nm.

10. A plastic material comprising a plastic and a laser additive according to claim 1 as a laser adsorber.

11. A laser additive comprising core/shell particles, characterised in that the core/shell particles in each case have a particulate core of homogeneous composition which contains alkaline-earth metal ions and OH groups and has a surface with OH groups located thereon, wherein the shell consists of a mixture of nano crystalline carbon and amorphous carbon with proportions by weight in the ratio from 70:30 to 90:10.

12. The laser additive according to claim 11, wherein the alkaline-earth ions are at least one type of ions selected from the group consisting of $Ca^{2+}$, $Mg^{2+}$ and $Ba^{2+}$.

13. The laser additive according to claim 8, wherein the particulate cores consist of $Ca_5(OH)(PO_4)_3$, $Mg_3Si_4O_{10}(OH)_2$, or of $Ba^{2+}$- or $Mg^{2+}$-modified $Ca_5(OH)(PO_4)_3$.

14. The laser additive according to claim 11, wherein the shell consists of a mixture of nano crystalline carbon and amorphous carbon with proportions by weight in the ratio from 80:20 to 90:10.

15. A process for the preparation of a laser additive comprising core/shell particles, wherein the core/shell particles in each case have a particulate core of homogeneous composition which contains alkaline-earth metal ions and OH groups and has a surface with OH groups located thereon, where the shell consists of carbon, said process comprising:
bringing core particles of homogeneous composition which contain alkaline-earth metal ions and OH groups and have a surface with OH groups located thereon to reaction in a reactor
a) in a mixture with a solid carbon-containing precursor compound,
or
b) with supply of a carbon-containing precursor compound in a stream of carrier gas,
where the carbon-containing precursor compound is heated under inert gas to a temperature at which carbon is deposited from the carbon-containing precursor compound onto the surface of the core particles as outermost, continuous layer and a shell forms around the respective core particle.

16. The process according to claim 15, wherein the shell has a geometrical thickness in the range from 1 to 20 nm.

17. The process according to claim 15, wherein the carbon-containing precursor compound employed is acetone, acetylene, p-xylene, toluene, 2-methyl-3-butynol-2 or saccharides.

18. The process according to claim 15, wherein the core particles are kept in motion in the reactor.

19. The process according to claim 15, wherein the reaction is carried out at a temperature in the range from 500 to 850° C. and with a time duration in the range from 20 to 480 min.

20. The process according to claim 15, wherein each core particle is completely surrounded by the shell in a continuous layer and core particle and shell are chemically bonded to one another.

* * * * *